United States Patent
Ren

(10) Patent No.: US 10,236,811 B2
(45) Date of Patent: Mar. 19, 2019

(54) METHOD OF REALIZING SINGLE DIRECTION CHAOTIC ROTATION SPEED OF PERMANENT MAGNET SYNCHRONOUS MOTOR

(71) Applicant: XI'AN UNIVERSITY OF TECHNOLOGY, Shaanxi (CN)

(72) Inventor: Hai-Peng Ren, Shaanxi (CN)

(73) Assignee: XI'AN UNIVERSITY OF TECHNOLOGY, Xi'an, Shaanxi (CN)

( * ) Notice: Subject to any disclaimer, the term of this patent is extended or adjusted under 35 U.S.C. 154(b) by 0 days.

(21) Appl. No.: 15/756,810

(22) PCT Filed: Feb. 4, 2016

(86) PCT No.: PCT/CN2016/073418
§ 371 (c)(1),
(2) Date: Mar. 1, 2018

(87) PCT Pub. No.: WO2017/080120
PCT Pub. Date: May 18, 2017

(65) Prior Publication Data
US 2018/0254727 A1    Sep. 6, 2018

(30) Foreign Application Priority Data
Nov. 12, 2015   (CN) .......................... 2015 1 0771218

(51) Int. Cl.
*H02P 21/00* (2016.01)
*H02P 27/08* (2006.01)

(52) U.S. Cl.
CPC ............ *H02P 21/001* (2013.01); *H02P 21/00* (2013.01); *H02P 21/50* (2016.02); *H02P 27/08* (2013.01)

(58) Field of Classification Search
CPC .. H02P 21/22; H02P 21/18; H02P 6/16; H02P 2207/05; H02P 21/00
See application file for complete search history.

(56) References Cited

U.S. PATENT DOCUMENTS

| 10,069,447 B2* | 9/2018 | Spenninger | H02P 6/10 |
| 10,103,670 B2* | 10/2018 | Song | H02P 6/28 |
| 2006/0043923 A1* | 3/2006 | Baker | H02P 21/06 318/807 |
| 2008/0042613 A1* | 2/2008 | Aizawa | H02P 21/34 318/778 |
| 2013/0207589 A1* | 8/2013 | Margner | B60L 11/02 318/717 |

(Continued)

FOREIGN PATENT DOCUMENTS

| CN | 102882456 | 1/2013 |
| CN | 102923189 | 2/2013 |
| CN | 103391037 | 11/2013 |

(Continued)

OTHER PUBLICATIONS

International Search Report for PCT/CN2016/073418, English Translation attached to original, Both completed by the Chinese Patent Office dated Jul. 29, 2016, All together 6 Pages.

*Primary Examiner* — Thai T Dinh
(74) *Attorney, Agent, or Firm* — Brooks Kushman P.C.

(57) ABSTRACT

A method of realizing single direction chaotic rotation speed of permanent magnet synchronous motor is provided powered by a three-phase full-bridge inverter.

4 Claims, 3 Drawing Sheets

(56) References Cited

U.S. PATENT DOCUMENTS

2013/0241461 A1\* 9/2013 Huang .................. G05B 11/30
318/609

FOREIGN PATENT DOCUMENTS

| CN | 105245146 | 1/2016 |
|---|---|---|
| GB | 2390767 | 1/2004 |
| JP | H07313782 | 12/1995 |
| JP | 2013110859 | 6/2013 |
| KR | 100223885 | 10/1999 |

\* cited by examiner

METHOD OF REALIZING SINGLE DIRECTION CHAOTIC ROTATION SPEED OF PERMANENT MAGNET SYNCHRONOUS MOTOR

CROSS-REFERENCE TO RELATED APPLICATION

This application is the U.S. national phase of PCT Application No. PCT/CN2016/073418 filed on Feb. 4, 2016, which claims priority to CN Patent Application No. 201510771218.1 filed on Nov. 12, 2015, the disclosures of which are incorporated in their entirety by reference herein.

TECHNICAL FIELD

The present disclosure belongs to the technical field of controlling a permanent magnet synchronous motor, and relates to a method of realizing a single direction chaotic rotation speed of a permanent magnet synchronous motor.

BACKGROUND ART

In recent years, with the in-depth study on chaos, it was found that chaos can achieve better performance in many industrial applications. For example, in the field of vibrating compaction, a wide spectrum characteristic of chaotic motion may cause mixed particles with different intrinsic frequencies to be resonance; a velocity change rate of chaotic motion is more dramatic than periodic vibration, thereby achieving a better compaction performance. In some practical engineering applications, it is desirable to generate required chaotic phenomenon (that is, chaos anti-control) in industrial processing. The commonly used motor chaos anti-control methods mainly include: a delayed feedback control method, a tracking control method, and a dedicated motor parameter design method.

The existing delayed feedback control method may cause positive/negative rotation speed of motor, and accordingly, a positive/reversed rotation of the motor may frequently occur. On one hand, for certain industrial procedures, such a feature has little practical importance, and on the other hand, a forward/reverse aperiodic rotation of the motor will reduce service life of mechanical devices and motors. Although the tracking control method can achieve single direction chaotic speed, the fast speed reference change tracking is restricted by system response time, thus having certain limitations. In addition, by designing motor parameters such as an air gap flux linkage, an armature inductance, and so on, a motor system may generate a chaotic rotation speed. However, a chaotic motion generated by this way may not be easily maneuvered, and loses the flexibility to adapt to different purposes.

SUMMARY

The present disclosure aims to provide a method of realizing a single direction chaotic rotation speed of a permanent magnet synchronous motor, which solves the problem existing in the prior art, that is, there exists positive/negative chaotic rotation speed of the motor, and may increase demands for mechanical performance of a motor.

The present disclosure adopts the following technical solutions: a method of realizing a single direction chaotic rotation speed of a permanent magnet synchronous motor, which is implemented according to the following steps:

Step 1: collecting analog signals of two among three phases current of the permanent magnet synchronous motor using two current Hall sensors, and converting the analog signal of the two phases current into digital state values $i_A(t)$ and $i_B(t)$ through a two-way analog-digital converter in a digital signal processor;

Step 2: collecting a mechanical angular position increment of the permanent magnet synchronous motor through an encoder connected to a shaft of the permanent magnet synchronous motor and a quadrature encoded pulse input module in the digital signal processor, in order to obtain an electrical angle $\theta(t)$;

Step 3: performing, in the digital signal processor, a CLARK transformation on the two phases current $i_A(t)$ and $i_B(t)$ of the permanent magnet synchronous motor obtained in Step 1, and obtaining current values $i_\alpha(t)$ and $i_\beta(t)$ under a $\alpha$–$\beta$ stationary coordinate system;

Step 4: performing, in the digital signal processor, a PARK transformation on the current values $i_\alpha(t)$ and $i_\beta(t)$ obtained in Step 3 by using the electrical angle $\theta(t)$ obtained in Step 2, and obtaining feedback values of the current (namely, a direct axis current $i_d(t)$ and a quadrature axis current $i_q(t)$) under a d–q rotary coordinate system;

Step 5: setting, in the digital signal processor, a direct axis current reference as $i_{dref}=0$, and subtracting the direct axis feedback value $i_d(t)$ obtained in Step 4 from the direct axis current reference to obtain an error signal $e(t)$, and inputting the error signal $e(t)$ into a PI regulator to obtain a direct axis manipulate variable $U_d(t)$;

Step 6: obtaining an average rotation speed $\bar{n}(t)$ of the permanent magnet synchronous motor through a rotation speed mean value calculation by using the electrical angle $\theta(t)$ obtained in Step 2, and multiplying a difference between the electrical angle $\bar{n}(t)$ and a desired base speed $n_{ref}(t)$ of the single direction chaotic rotation speed of the permanent magnet synchronous motor by a proportional factor $K_2$, then adding a base value voltage $u_{base}(t)$ to the product to obtain a voltage base value component $u_q(t)$;

Step 7: subtracting $i_q(t-\tau)$ obtained after a delaying process with respect to the quadrature axis current $i_q(t)$ from the quadrature axis current $i_q(t)$ obtained in Step 4, multiplying the result of subtraction by a proportional factor $K_1$, and adding the voltage base value component $u_q(t)$ to the product to obtain a quadrature axis manipulate variable $U_q(t)$;

Step 8: performing, in the digital signal processor, a PARK inverse transformation on the manipulate variables $U_d(t)$ and $U_q(t)$ obtained respectively in Step 5 and Step 7 by using the electrical angle $\theta(t)$ obtained in Step 2, in order to obtain voltage values $U_\alpha(t)$ and $U_\beta(t)$ under a $\alpha$–$\beta$ stationary coordinate system;

Step 9: performing a space vector modulation in the digital signal processor by taking the voltage values $U_\alpha(t)$ and $U_\beta(t)$ obtained in Step 8 as inputs, and obtaining six control pulses for a driving inverter;

Step 10: generating, through inversion, a three-phase AC power by using a three-phase full-bridge inverter in the driving inverter by taking the six control pulses obtained in Step 9 as inputs to supply the power to the permanent magnet synchronous motor, in order to control the permanent magnet synchronous motor to realize single direction chaotic rotation speed.

The advantages of the present disclosure are as follows:
1) Allowing the permanent magnet synchronous motor to perform chaotic motion in a range centered by a certain base speed, achieving chaotic motor speed to satisfy certain industrial processes or production process requirements, and extending the application scope of the motor in the industrial process.

2) Compared with a conventional direct time delayed feedback control method, the present disclosure may achieve single direction chaotic motor speed in a range centered by a certain base value, which would not be restricted by a system response time compared with a tracking control chaos generation method, also, compared with a dedicated motor parameter generation method, the proposed method may obtain more flexibility.

3) The method of the present disclosure is applied to vibratory compaction, and comparative tests indicates that the method of the present disclosure achieves greater descending displacement in an unit time, and consumes less energy per pressing unit, thereby achieving better compaction performance.

DETAILED DESCRIPTION OF EXEMPLARY EMBODIMENTS

Below the embodiments are described in detail in conjunction with the accompanying drawings to explain the present invention.

Figure 1:
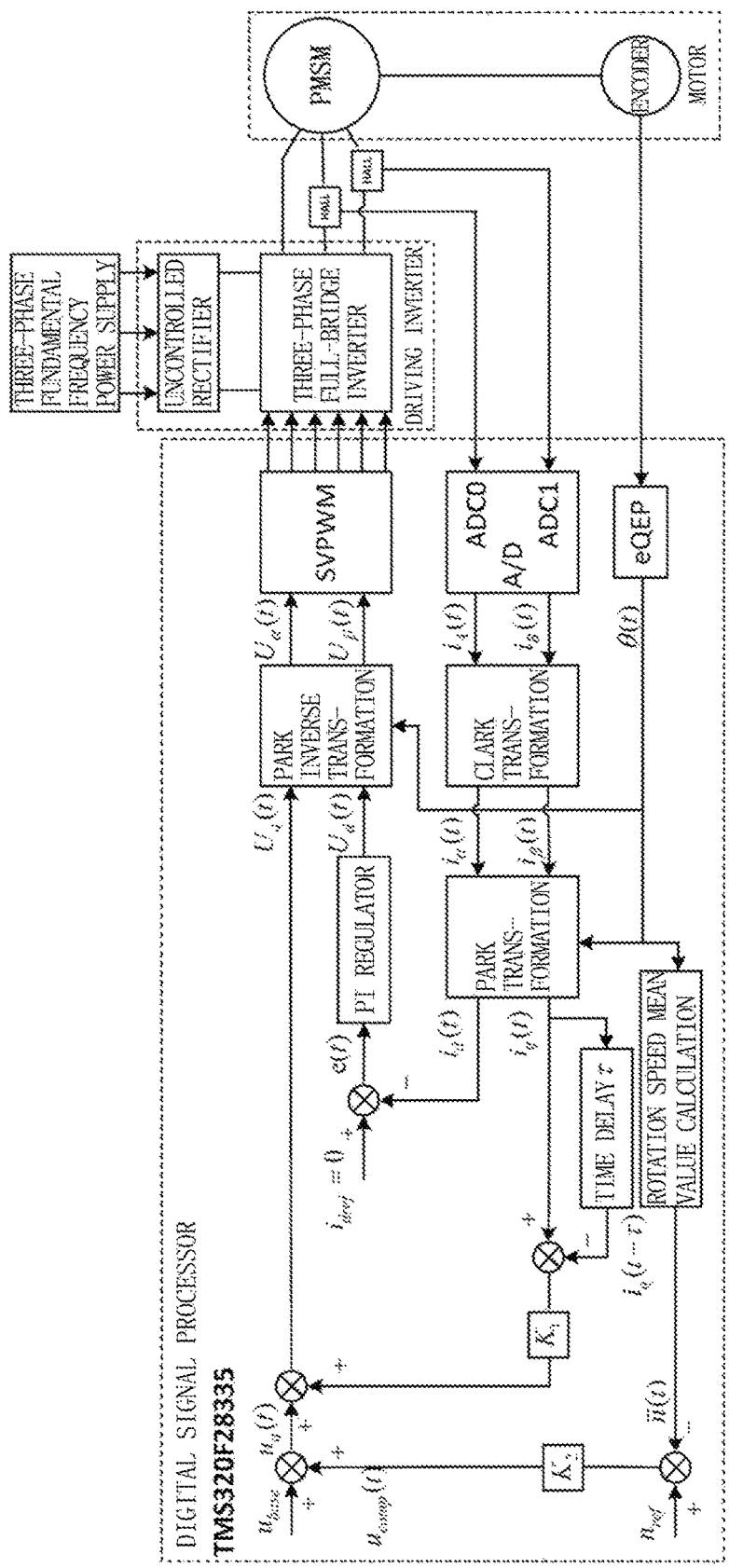
FIG. 1 is a system block diagram of the method of the present disclosure.

As shown in FIG. 1, a system structure on which a method of realizing a single direction chaotic rotation speed of a permanent magnet synchronous motor depends according to the present disclosure includes three major parts, that is, a digital signal processor, a driving inverter and a permanent magnet synchronous motor, which are shown respectively by dashed boxes in FIG. 1, wherein the digital signal processor includes a two-way analog-to-digital converter (A/D), a quadrature encoded pulse input circuit (eQEP) and a six-way driving signal generator using space vector pulse width modulation (SVPWM); the two-way analog-to-digital converter is connected to a PARK transformation (module) through a CLARK transformation (module); after subtracting a direct current reference $i_{dref}$ from one output $i_d(t)$ of the PARK transformation (module), a result of subtraction is fed to a PARK inverse transformation module through a PI (proportional integral) regulator; after subtracting a $i_q(t-\tau)$ obtained through a time delay process of another output $i_q(t)$ of the PARK transformation (module) from said another output $i_q(t)$, the result of subtraction is multiplied by a proportional factor $K_1$, and after adding the product to a base value component $u_q(t)$, the result is fed to the PARK inverse transformation module; an output of the quadrature encoded pulse input circuit is not only delivered to the PARK transformation and the PARK inverse transformation, but also fed to a rotation speed mean value calculation module so as to calculate an average rotation speed $\bar{n}(t)$ of the permanent magnet synchronous motor; after subtracting a desired base speed (i.e. desired value of average rotation speed) $n_{ref}$ of the single direction chaotic rotation speed of the permanent magnet synchronous motor from the calculated average rotation speed $\bar{n}(t)$, the result of subtraction is multiplied by a proportional factor $K_2$, and the product is added to a voltage base value $u_{base}(t)$ to obtain a voltage base value component $u_q(t)$.

The permanent magnet synchronous motor is provided with an encoder for detecting the rotation speed, an output signal of the encoder enters a quadrature encoded pulse module to obtain an electrical angle $\theta(t)$ of the motor, and the quadrature encoded pulse module output is connected respectively with the PARK inverse transformation (module), the PARK transformation (module) and a rotation speed mean value calculation (module) at the same time; two phases current among three phases current of the motor are collected accordingly through two current Hall sensors, and enter the two-way analog-to-digital converter (entering through ADC0 and ADC1 ports, respectively) to obtain two phases current $i_A(t)$ and $i_B(t)$.

The driving inverter includes a three-phase full-bridge inverter which is connected with a three-phase fundamental frequency power supply through an uncontrolled three-phase rectifier module; a driving signal generated by the six-way driving signal generator drives the three-phase full-bridge inverter to supply power to the permanent magnet synchronous motor (to control the permanent magnet synchronous motor).

In addition, a vector-controlled frame is adopted to allow a given value of direct axis current $i_{dref}=0$, and a direct axis current closed-loop is constituted through a current loop PI regulator to obtain a direct axis manipulate variable $U_d(t)$; a quadrature axis current adopts a direct delaying feedback method, and a base value component $u_q(t)$ is added based on above to obtain a quadrature axis current manipulate variable $U_q(t)$.

A preferred model of the digital signal processor is TMS320F28335.

A single direction chaotic speed generation method accordance with the present disclosure is realized through the above system, and is implemented as per the following steps:

Step 1: collecting analog signals of two among three phases current of the permanent magnet synchronous motor (PMSM in FIG. 1) through two current Hall sensors (i.e. the two Hall modules in FIG. 1), and obtaining digital values $i_A(t)$ and $i_B(t)$ of the two phases current of the motor through detection by the two-way analog-digital converter (two channels ADC0 and ADC1 in the A/D module as shown in FIG. 1) in a digital signal processor.

Step 2: collecting a mechanical angular position increment of the permanent magnet synchronous motor through an encoder (the encoder in FIG. 1) connected to a shaft of the permanent magnet synchronous motor and a quadrature encoded pulse input module (the eQEP in FIG. 1) of the digital signal processor, in order to obtain an electrical angle $\theta(t)$.

Step 3: performing, in the digital signal processor, a CLARK transformation (through the CLARK transformation module in FIG. 1) on the two phases of current $i_A(t)$ and $i_B(t)$ of the permanent magnet synchronous motor obtained in Step 1, and obtaining current values $i_\alpha(t)$ and $i_\beta(t)$ under a $\alpha$–$\beta$ stationary coordinate system.

Step 4: performing, in the digital signal processor, a PARK transformation (through the PARK transformation module in FIG. 1) on the current values $i_\alpha(t)$ and $i_\beta(t)$ obtained in Step 3 by using the electrical angle $\theta(t)$ obtained in Step 2, and obtaining feedback values of the current (namely, a direct axis current $i_d(t)$ and a quadrature axis current $i_q(t)$) under a d-q rotary coordinate system.

Step 5: subtracting the feedback value $i_d(t)$ obtained in Step 4 from a direct axis current reference $i_{dref}=0$ to obtain an error signal e(t), and in the digital signal processor, the error signal e(t) enters the PI regulator (the PI regulator module in FIG. 1) to obtain a direct axis current manipulate variable $U_d(t)$; an expression on the regulation process of the PI regulator is as follows:

$$U_d(t)=K_p e(t)+K_i \int_0^t e(t) dt,$$

wherein $e(t)=i_{dref}-i_d(t)$, $K_p$ is a proportional coefficient, $K_i$ is an integral coefficient.

Step 6: obtaining an average rotation speed $\bar{n}(t)$ of the permanent magnet synchronous motor through a rotation speed mean value calculation module in the digital signal processor by using the electrical angle $\theta(t)$ obtained in Step 2, and multiplying a difference between the electrical angle $\bar{n}(t)$ and a desired base speed $n_{ref}(t)$ of the single direction chaotic rotation speed the permanent magnet synchronous motor by a proportional factor $K_2$, then adding a base value voltage $u_{base}(t)$ to the product to obtain a voltage base value component $u_q(t)$. Specifically, an average rotation speed $\bar{n}(t)$ of the permanent magnet synchronous motor is obtained through a rotation speed mean value calculation module (the rotation speed mean value calculation module in FIG. 1) in the digital signal processor by taking the electrical angle $\theta(t)$ obtained in Step 2 as the input, wherein $n_{ref}$ is a desired base speed of the single direction chaotic rotation speed of the permanent magnet synchronous motor, $u_{comp}(t)=K_2(n_{ref}-\bar{n}(t))$, $K_2$ is a proportional factor, $u_q(t)=u_{base}+u_{comp}(t)$, $u_{base}$ is a base value (i.e. a voltage base value) determined based on a desired base speed $n_{ref}(t)$ of the single direction chaotic rotation speed of the permanent magnet synchronous motor.

Step 7: subtracting $i_q(t-\tau)$ obtained after a delaying process with respect to the quadrature axis current $i_q(t)$ (through the time delay r module in FIG. 1) from the quadrature axis current $i_q(t)$ obtained in Step 4, multiplying the result of subtraction by a proportional factor $K_1$, and adding the voltage base value component $u_q(t)$ to the product to acquire a quadrature axis current manipulate variable $U_q(t)$;

an expression of the quadrature axis current manipulate variable $U_q(t)$ is: $U_q(t)=u_q(t)+K_1((i_q(t)-i_q(t-\tau)))$.

Step 8: performing, in the digital signal processor, a PARK inverse transformation (through the PARK inverse transformation module in FIG. 1) on the manipulate variables $U_d(t)$ and $U_q(t)$ obtained respectively in Step 5 and Step 7 by using the electrical angle $\theta(t)$ obtained in Step 2, in order to obtain voltage values $U_\alpha(t)$ and $U_\beta(t)$ under a $\alpha$-$\beta$ stationary coordinate system.

Step 9: performing a space vector modulation (through a space vector pulse width modulation (SVPWM) module in FIG. 1) in the digital signal processor by taking the voltage values $U_\alpha(t)$ and $U_\beta(t)$ obtained in Step 8 as inputs and obtaining six control pulses of switches in the driving inverter (the driving inverter module in FIG. 1).

Step 10: generating a three-phase AC power by using a three-phase full-bridge inverter (the three-phase full-bridge inverter module in FIG. 1) in the driving inverter by taking the six control pulses obtained in Step 9 as inputs to drive the permanent magnet synchronous motor, in order to control the permanent magnet synchronous motor to realize a single direction chaotic rotation speed.

Embodiments

The method of the present disclosure is applied to a compaction device, and comparison experiments are designed to validate effectiveness of the control method of the present disclosure, wherein mixtures of soil, sand and gravel are compacted for tests. The following different control methods are adopted in the experiments to control the operation of the motor: ①a constant speed control method; ②a chaotic rotation speed reference (tracking) control method; ③a control method of the present disclosure.

Figure 2:
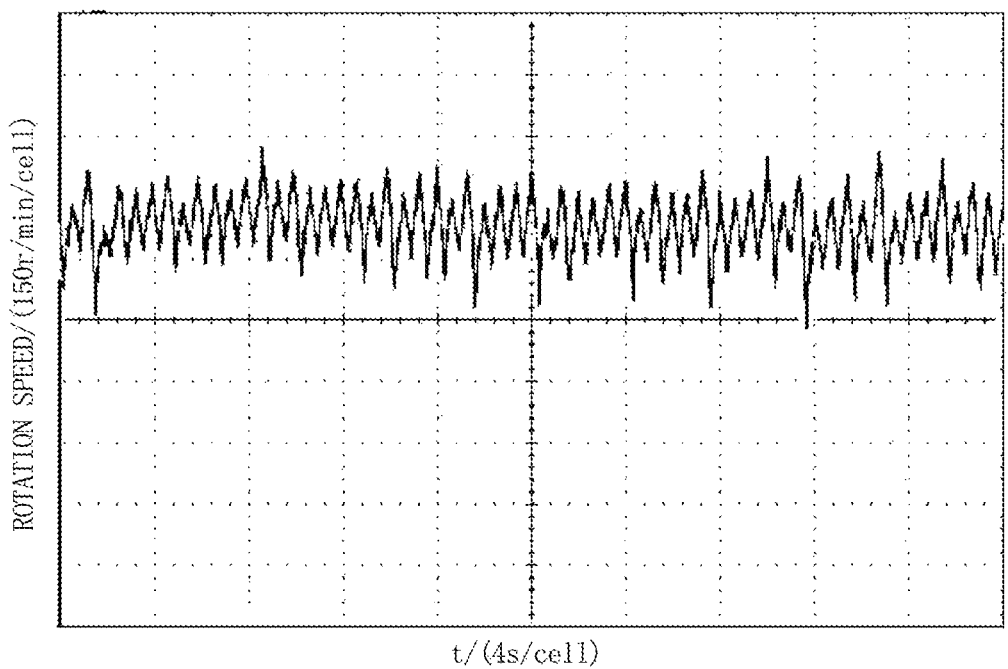
FIG. 2 shows a motor rotation speed experiment waveform generated by applying the method of the present disclosure to a vibratory compaction device.

FIG. 2 shows a motor rotation speed experiment waveform generated by applying the method of the present disclosure to a vibratory compaction device, wherein the waveform is generated by D/A conversion of the motor rotation speed obtained by calculation in the digital signal processor, and can be observed using an oscilloscope. The horizontal coordinate denotes time (4 seconds per cell), and the vertical coordinate denotes rotation speed (150 RPM per cell)

Figure 3:
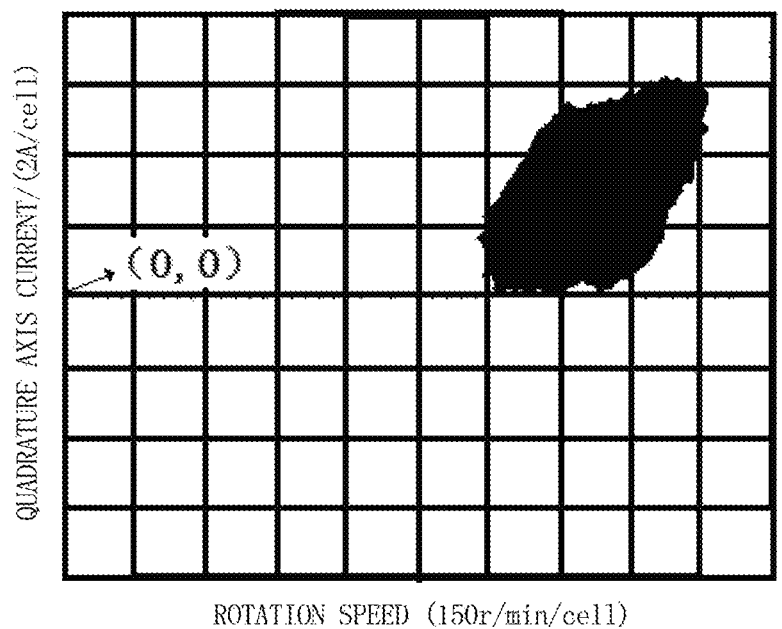
FIG. 3 is a diagram of a chaotic attractor on $\omega_r$–$i_q$ plane obtained by controlling the motor using the method of the present disclosure.

FIG. 3 shows a chaotic attractor on $\omega_r$-$i_q$ plane obtained by controlling the motor using the control method of the present disclosure. The motor rotation speed and the quadrature axis current obtained in the digital signal processor are transformed into analog signal by a D/A converter respectively, which, by taking the motor rotation speed as the horizontal axis (150 RPM per cell) and the quadrature axis current as the vertical axis (2 A per cell), can be observed using an oscilloscope.

Figure 4:
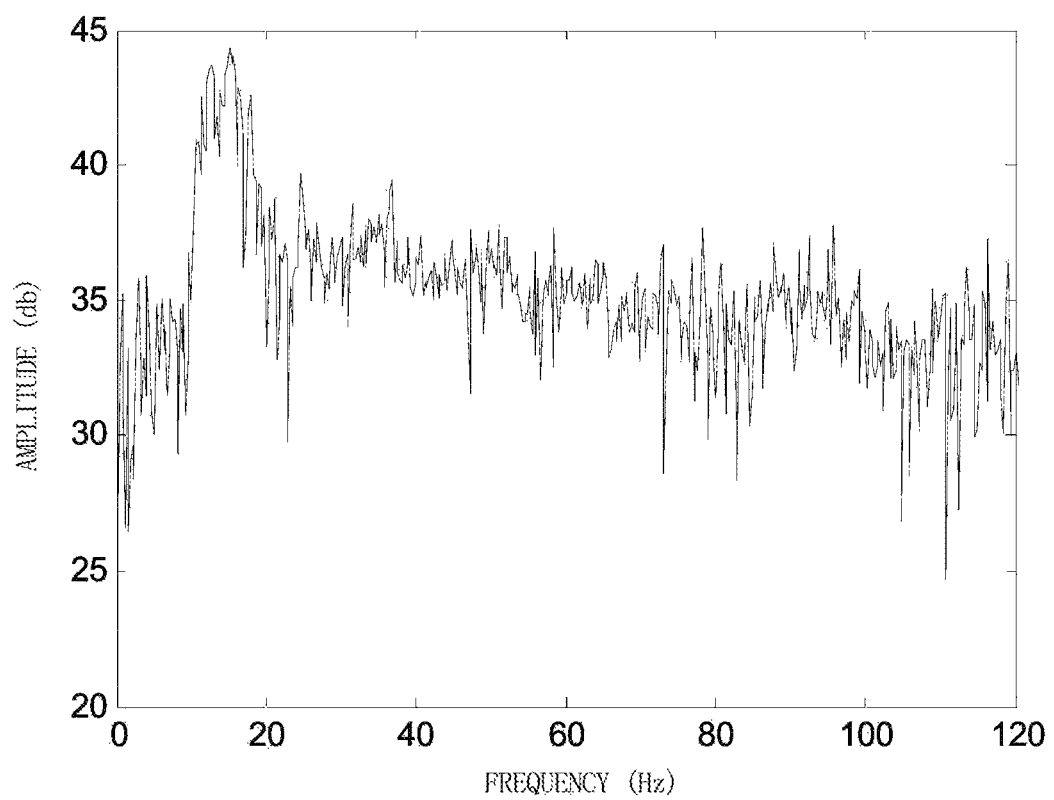
FIG. 4 shows a compaction force power spectrum generated by applying the method of the present disclosure to a vibratory compaction device.

FIG. 4 shows a force power spectrum generated by applying the control method of the present disclosure to a vibratory compaction device. The horizontal coordinate is frequency (unit: Hz), and the vertical coordinate is amplitude (unit: dB).

Table 1 below shows the comparison results of compaction performance using the above three methods.

TABLE 1

Comparison of Compaction Effect of the Three Methods

| Constant speed control | | Given chaotic rotation speed (tracking) control | | Method of the present disclosure | |
| --- | --- | --- | --- | --- | --- |
| Average consumption of energy KJ/mm | Average density $10^3$ Kg/m$^3$ | Average consumption of energy KJ/mm | Average density $10^3$ Kg/m$^3$ | Average consumption of energy KJ/mm | Average density $10^3$ Kg/m$^3$ |
| 5.43 | 1.3103 | 4.59 | 1.3164 | 3.32 | 1.3244 |

Comparison experiments indicates that the method of the present disclosure achieves greater descending displacement of compaction in an unit time, and consumes less energy per descending displacement unit, thereby achieving better compaction performance.

The invention claimed is:

1. A method of realizing a single direction chaotic rotation speed of a permanent magnet synchronous motor, characterized in that the method comprising:

Step 1: collecting analog signals of two among three phases current of the permanent magnet synchronous motor using two current Hall sensors, and converting the analog signal of the two phases current into digital state values $i_A(t)$ and $i_B(t)$ through a two-way analog-digital converter in a digital signal processor;

Step 2: collecting a mechanical angular position increment of the permanent magnet synchronous motor through an encoder connected to a shaft of the permanent magnet synchronous motor and a quadrature encoded pulse input module in the digital signal processor, in order to obtain an electrical angle $\theta(t)$;

Step 3: performing, in the digital signal processor, a CLARK transformation on the two phases current $i_A(t)$ and $i_B(t)$ of the permanent magnet synchronous motor obtained in Step 1, and obtaining current values $i_\alpha(t)$ and $i_\beta(t)$ under a $\alpha$-$\beta$ stationary coordinate system;

Step 4: performing, in the digital signal processor, a PARK transformation on the current values $i_\alpha(t)$ and $i_\beta(t)$ obtained in Step 3 by using the electrical angle $\theta(t)$ obtained in Step 2, and obtaining feedback values of the current (namely, a direct axis current $i_d(t)$ and a quadrature axis current $i_q(t)$) under a d-q rotary coordinate system;

Step 5: setting, in the digital signal processor, a direct axis current reference as $i_{dref}=0$ and subtracting the direct axis feedback value $i_d(t)$ obtained in Step 4 from the direct axis current reference to obtain an error signal $e(t)$, and inputting the error signal $e(t)$ into a PI regulator to obtain a direct axis manipulate variable $U_d(t)$;

Step 6: obtaining an average rotation speed $\bar{n}(t)$ of the permanent magnet synchronous motor through a rotation speed mean value calculation by using the electrical angle $\theta(t)$ obtained in Step 2, and multiplying a difference between the electrical angle $\bar{n}(t)$ and a desired base-speed $n_{ref}(t)$ of the single direction chaotic rotation speed of the permanent magnet synchronous motor by a proportional factor $K_2$, then adding a base value voltage $u_{base}(t)$ to the product to obtain a voltage base value component $u_q(t)$;

Step 7: subtracting $i_q(t)$ obtained after a delaying process with respect to the quadrature axis current from the quadrature axis current $i_q(t-\tau)$ obtained in Step 4, multiplying the result of subtraction by a proportional factor $K_1$, and adding the voltage base value component $u_q(t)$ to the product to obtain a quadrature axis manipulate variable $U_q(t)$;

Step 8: performing, in the digital signal processor, a PARK inverse transformation on the manipulate variables $U_d(t)$ and $U_q(t)$ obtained respectively in Step 5 and Step 7 by using the electrical angle $\theta(t)$ obtained in Step 2, in order to obtain voltage values $\alpha$-$\beta$ and $U_\alpha(t)$ under a $U_\beta(t)$ stationary coordinate system;

Step 9: performing a space vector modulation in the digital signal processor by taking the voltage values $U_\alpha(t)$ and $U_\beta(t)$ obtained in Step 8 as inputs, and obtaining six control pulses for a driving inverter;

Step 10: generating, through inversion, a three-phase AC power by using a three-phase full-bridge inverter in the driving inverter by taking the six control pulses obtained in Step 9 as inputs to supply the power to the permanent magnet synchronous motor, in order to control the permanent magnet synchronous motor to realize the single direction chaotic rotation speed.

2. The method of realizing the single direction chaotic rotation speed in the permanent magnet synchronous motor of claim 1, characterized in that in Step 5, an expression of the regulation process of the PI regulator is as follows:

$$U_d(t)=K_p e(t)+K_i \int_0^t e(t)dt,$$

wherein $e(t)=i_{dref}-i_d(t)$, $K_p$ is a proportional coefficient, $K_i$ is an integral coefficient.

3. The method of realizing the single direction chaotic rotation speed in the permanent magnet synchronous motor of claim 1, characterized in that in Step 7, an expression of the manipulate variable $U_q(t)$ is:

$$U_q(t)=u_q(t)+K_i((i_q(t)-i_q(t-\tau)),$$

wherein $u_q(t)=u_{base}+u_{comp}(t)$, $u_{base}$ is a base value determined based on a desired base speed of the unidirectional chaotic motion of the rotation speed of the permanent magnet synchronous motor, $u_{comp}(t)=K_2(n_{ref}-\bar{n}(t))$, $K_2$ is a proportional factor, $n_{ref}$ is a desired base speed of the single direction chaotic rotation speed of the permanent magnet synchronous motor, and an average rotation speed $\bar{n}(t)$ of the permanent magnet synchronous motor is obtained through a rotation speed mean value calculation in the digital signal processor by taking the electrical angle $\theta(t)$ obtained in Step 2 as the input.

4. The method of realizing the single direction chaotic rotation speed in the permanent magnet synchronous motor of claim 1, characterized in that the device structure on which the method depends comprises the digital signal processor, the driving inverter and the permanent magnet synchronous motor, wherein the digital signal processor comprises a two-way analog-to-digital converter, a quadrature encoded pulse input circuit and a six-way driving signal generator; the two-way analog-to-digital converter is connected to a PARK transformation module through a CLARK transformation module; after subtracting a direct current reference $i_{dref}$ from one output $i_d(t)$ of the PARK transformation module, a result of subtraction is fed to a PARK inverse transformation module through a PI regulator; after subtracting a $i_q(t-\tau)$ obtained through a time delay process of another output $i_q(t)$ of the PARK transformation module from said another output $i_q(t)$, the result of subtraction is multiplied by a proportional factor $K_1$, and after adding the product to a base value component $u_q(t)$, the result is fed to the PARK inverse transformation module; an output of the quadrature encoded pulse input circuit is not only fed into the PARK transformation module and the PARK inverse transformation module, but also fed to a rotation speed mean value calculation module in the digital signal processor so as to calculate an average rotation speed $\bar{n}(t)$ of the permanent magnet synchronous motor; after subtracting a desired base speed $n_{ref}$ from the average rotation speed $\bar{n}(t)$, the result of subtraction is multiplied by a proportional factor $K_2$, and the product is added to a voltage base value $u_{base}(t)$ to obtain a voltage base value component $u_q(t)$;

the permanent magnet synchronous motor is provided with an encoder for detecting the rotation speed, an output signal of the encoder enters a quadrature encoded pulse module to obtain an electrical angle $\theta(t)$ of the motor, and the quadrature encoded pulse module output is connected respectively with the PARK inverse transformation module, the PARK transformation module and the rotation speed mean value calculation module at the same time; two phases current among three phases current of the motor are collected accordingly through two current Hall sensors, and enter the two-way analog-to-digital converter respectively, to obtain digital values $i_A(t)$ and $i_B(t)$ of the two phases current;

the driving inverters comprises a three-phase full-bridge inverter which is connected with a three-phase fundamental frequency power supply through an uncontrolled rectifier module; a driving signal generated by the six-way driving signal generator drives the three-phase full-bridge inverter to supply power to the permanent magnet synchronous motor to control the permanent magnet synchronous motor.

\* \* \* \* \*